United States Patent Office 3,413,272
Patented Nov. 26, 1968

3,413,272
PROCESS AND PRODUCT OF ACYL HALIDE COPOLYMERS REACTED WITH AN IMINE COMPOUND
Richard Watkin Rees, Wilmington, Del., assignor to E. I. du Pont de Nemours and Company, Wilmington, Del., a corporation of Delaware
No Drawing. Filed Nov. 18, 1965, Ser. No. 508,580
7 Claims. (Cl. 260—78.5)

This invention relates to copolymers containing polymerized units having the formula

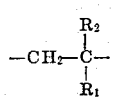

where $R_1$ is a radical selected from the class consisting of hydrogen, halogen, and hydrocarbon radicals having 1 to 8 carbon atoms, and $R_2$ is a radical selected from the class consisting of hydrogen, halogen, and methyl radicals; and polymerized alpha,beta-ethylenically unsaturated carboxylic acid units that have been modified to contain an N-acyl aziridine radical. This invention also relates to methods of producing such copolymers, and to composite structures that result from the reaction of the N-acyl aziridine radical and another organic group on a substrate.

It is known in the art to produce copolymers having units of the formula

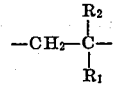

and units obtained by polymerization of an alpha,beta-ethylenically unsaturated carboxylic acid. The present invention is concerned with the modification of copolymers of this type.

The unmodified copolymers employed in the present invention as starting materials are preferably of high molecular weight. The melt index of the alpha-olefin copolymers is within the range of 0.1 to 1000 g./10 minutes and preferably within the range of 1.0 to 500 g./10 minutes as measured by ASTM D1238–57T. The copolymers must contain at least 50 mole percent units having the formula

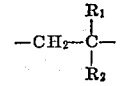

where $R_1$ is a radical selected from the class consisting of hydrogen, halogen and hydrocarbon radicals having 1 to 8 carbon atoms, and $R_2$ is a radical selected from the class consisting of hydrogen, halide, and methyl; preferably, at least 80 mole percent of the units are of this type. Specific units useful in the copolymers are those derived on polymerization of ethylene, propylene, butene-1, styrene, pentene-1, hexene-1, heptene-1,3-methylbutene-1, 4-methylpentene-1, butadiene, vinyl halide, and vinylidene halide. The copolymers must contain between .1 and 25 mole percent acid halide units, preferably .2 to 10 mole percent. The halogen is preferably chlorine, but it may also be bromine, iodine or fluorine. These units are derived from the polymerization of alpha, beta-ethylenically unsaturated carboxylic acids having 3 to 8 carbon atoms followed by reaction with a halogenating agent to convert the acid group to the acyl halide. Specific acids that are useful in the copolymers include acrylic, methacrylic, ethacrylic, itaconic, maleic, fumaric, monoesters of dicarboxylic acid, such as ethyl hydrogen fumarate and maleic anhydride.

The preferred process for preparing the ethylene copolymers for use in the process of the present invention is direct copolymerization. This may be achieved by introducing the monomers into a polymerization environment maintained at high pressures, 50 to 3000 atmospheres, and at elevated temperature, 150 to 300° C., together with a free radical polymerization catalyst. An inert solvent such as water or benzene may be employed in the polymerization environment. Random distribution of carboxylic acid groups in all the polymer molecules is best obtained by direct copolymerization. A suitable process for the production of the random ethylene/acid copolymers is described in Canadian Patent No. 655,298, issued Jan. 1, 1963.

The copolymer need not necessarily comprise a two component polymer. More than one monomer having the formula

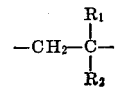

may be employed, and more than one alpha,beta-ethylenically unsaturated acid may be employed. Additionally, other inert copolymerizable monomers can be employed in the copolymer. The term "inert" is used to define monomers which do not react with the acid halide. The scope of copolymers suitable for conversion to acyl halide copolymers is illustrated by the following examples:

ethylene/acrylic acid copolymers,
ethylene/methacrylic acid copolymers,
ethylene/itaconic acid copolymers,
ethylene/methyl hydrogen maleate copolymers,
ethylene/maleic acid copolymers,
ethylene/acrylic acid methyl methacrylate copolymers,
ethylene/methacrylic acid/ethyl acrylate copolymers,
ethylene/itaconic acid/methyl methacrylate copolymers,
ethylene/methyl hydrogen maleate/ethyl acrylate copolymers,
ethylene/methacrylic acid/vinyl acetate copolymers,
ethylene/acrylic acid/vinyl formate copolymers,
ethylene/propylene/acrylic acid copolymers,
ethylene/styrene/acrylic acid copolymers,
ethylene/fumaric acid/vinyl methyl ether copolymers,
ethylene/vinyl chloride/acrylic acid copolymers,
ethylene/vinylidene chloride/acrylic acid copolymers,
ethylene/vinyl fluoride/methacrylic acid copolymers, and
ethylene/chlorotrifluoroethylene/methacrylic acid copolymers.

The unmodified copolymer is reacted with a halogenating agent such as phosphorus pentachloride. A suitable process is by forming a slurry of the acid copolymer in a halogenated solvent such as carbon tetrachloride to which is added the halogenating agent. After heating with agitation, nearly complete conversion of the acid OH groups of acyl halide groups is obtained. This process is more fully described in U.S. patent application Ser. No. 254,567. The resulting acyl halide copolymer is then reacted with an imine compound having the formula

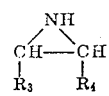

where $R_3$ and $R_4$ are hydrogen or alkyl groups having 1 to 6 carbon atoms, to form an N-acyl aziridine containing unit in the copolymer. The reactions are exemplified by the following equation:

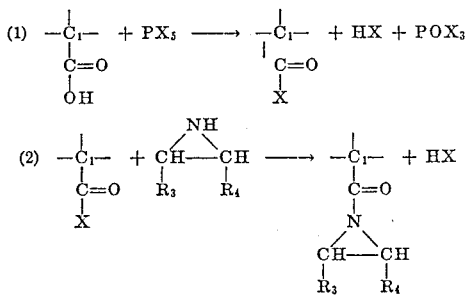

where $C_1$ is a carbon atom in the main copolymer chain, P is phosphorus and X is halogen.

The copolymer containing the N-acyl aziridine radical is fairly stable under basic and neutral conditions, but under acid conditions (acid in either the traditional sense—proton type acid, or Lewis acid sense) the heterocyclic ring opens at the nitrogen atom, yielding sites for attachment of other compounds. In particular, the heterocyclic ring opening may be used for attachment to compounds containing hydroxyl groups, amine groups, amide groups and carboxyl groups. This reaction may be exemplified as follows:

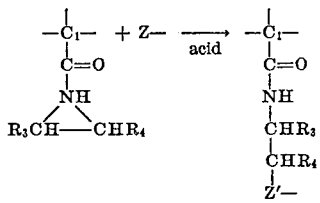

where $C_1$, $R_3$ and $R_4$ are as previously defined and Z— is a radical selected from the class consisting of

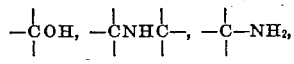

and

and Z′ is the Z radical that has reacted and is covalently bonded through an atom selected from the class consisting of nitrogen and oxygen to the carbon atom previously attached to the nitrogen in the aziridine ring.

Specific imine compounds useful in reacting with the acyl halide groups containing copolymers to produce the modified copolymers of the present invention are ethylene imine, propylene imine, butylene imine, pentene imine.

The reaction of the imine compounds with the acyl halide copolymers is most readily carried out by dissolving the copolymer in a hydrocarbon solvent such as toluene, benzene, carbon tetrachloride, perchloroethylene, trichloroethylene, cyclohexene, methylene chloride, and the like. To speed the dissolving process the solution may be heated mildly. The imine compound is then added to the dissolved acyl halide group containing copolymer; preferably the imine compound is dissolved in a similar hydrocarbon type solvent prior to adding it to the solution of the copolymer. The amount of imine compound added to the copolymer to obtain complete conversion of the acyl halide groups to N-acyl aziridine groups should be at least stoichiometrically equivalent to the number of acyl halide groups, and preferably, in order to obtain complete conversion rapidly, a large excess (2 to 10 times the stiochiometric amount) is added. Of course, it is not necessary that all the acyl halide groups be converted to N-acyl aziridine groups, but at least about 0.2 mole percent should be converted. The solution of solvent, copolymer and imine is then preferably mildly heated (50° C. to about 85° C.) until the desired degree of conversion is obtained. The length of time required to obtain the desired degree of conversion will depend on the temperature of the solutions, the concentration of the imine compound, the concentration of the copolymer of the copolymer in the solvent, and other variables, but in general, the conversion will be as complete as desired in less than 4 hours.

The N-acyl aziridine group containing copolymer is then removed from the solvent by evaporation of the solvent, or preferably by precipitation of the copolymer by the addition of a nonsolvent such as acetone, methanol, dioxane, methyl ethyl ketone. The copolymer is then preferably washed with a nonsolvent to remove any impurities such as unreacted imine compound.

The resulting copolymers are useful to react with various organic substrate materials to form coatings. Thus, the copolymer may be applied to organic materials having amine, amide, hydroxyl or carboxyl groups, such as nylon, wool, cotton, and Dacron (a polyester made from methyl terephthalate and ethylene glycol). Such coatings decrease the tendency of proteinaceous and cellulosic materials to shrink. The copolymers of this invention are particularly valuable as coating materials because they can be applied either as an aqueous dispersion, or as a solution in the hydrocarbon solvents.

The aziridine ring opens most readily and the copolymer reacts most readily with the organic material when the reaction media contains catalytic amounts of molecules or ions capable of coordinating with unshared electron pairs—i.e., that the reaction media contain "acid" as the term is used in the Lewis acid definition. Such "acids" include boron trifluoride, aluminum trichloride, tin tetrachloride, titanium tetrachloride, adipic acid, formic acid, glutaric acid, paratoluene sulfonic acid, sulfuric acid, hydrochloric acid, and phosphoric acids or salts which form these acids. The preferred range of concentration of the "acid" catalyst is 0.001 to 0.5% by weight of the reaction medium exclusive of the copolymer and the organic substrate.

The reaction between the modified copolymer and the organic materials can best be accomplished by forming a dispersion or a solution of the copolymer in a suitable liquid. The liquid may be water, in which case a dispersion will result; or it may be an organic solvent, such as carbon tetrachloride in which case a solution of the copolymer in an organic solvent will result. In the preferred embodiment, the organic material to be coated with the copolymer is first treated with an "acid" compound, so that small amounts of "acid" are present on the surface to catalyze the opening of the aziridine ring.

In the following examples which illustrates the invention, all parts and percentages are in parts by weight unless otherwise noted.

EXAMPLE I

Preparation of the aziridine copolymers

One hundred grams of a random ethylene-methacrylyl chloride copolymer prepared by reacting a chlorinating agent with the product obtained by the process disclosed in Canadian Patent 655,298, having a weight ratio of ethylene to methacrylyl chloride of 95 to 5, and a melt index of about 7 g./10 minutes, were dissolved in 1 liter of toluene at 60° C. Twenty-five cc. of distilled triethylamine were added, and then 5.0 grams of propylene imine dissolved in 20 cc. of dry toluene were added. The solution was heated at 60° C. for 30 minutes and then added to a large amount of acetone, about 2 liters. The polymer was recovered, washed with acetone and dried. Infrared examination of films of the polymer formed by pressing the polymer, indicated complete conversion of the methacrylyl chloride group to the aziridine copolymer. Absorption peaks were present at $5.9\mu$ and $7.1\mu$ corresponding to the amide carbonyl and the ring methyl group respectively.

Preparation of aqueous dispersion

A 20 grams sample of the ethylene/N-methacrylyl-2-methyl aziridine copolymer was dissolved in 180 grams of benzene at 55° C. This solution was slowly added with vigorous stirring to 100 grams of water containing 1 gram of sodium oleate. The water was at 60° C. The stirring was maintained for 10 minutes. The product was an emulsion. The emulsion was transferred to a round bottom flask and most of the benzene stripped under a partial vacuum of about 170 mm. of Hg pressure, at a temperature of 30° to 40° C. The solids content of the resultant aqueous dispersion was 19%.

Coating an organic material

Eight-inch by eight-inch pieces of cotton poplin were padded with a 0.5% solution of $Zn(BF_4)_2$ in water. After padding, the cotton was dried at 50° C. for thirty minutes under partial vacuum. The cotton picked up about 0.3% by weight of the Lewis acid catalyst. A portion of the dispersion of ethylene/N-methacrylyl-2-methyl aziridine in water was diluted with water to form a dispersion containing 4.75 weight percent polymer. The cotton samples were then padded with the dispersion and cured at 125° C. for thirty minutes.

After curing, the samples were brought to a standard condition of 50% relative humidity at 73° F., and weighed. The samples were then extracted for four hours, brought to standard condition, reweighed. Some samples were extracted for an additional four hours, again brought to standard conditions and again weighed. The results are shown in the following table.

TABLE

|  | Sample | | |
|---|---|---|---|
|  | I | II | III |
| Wt. percent $Zn(BF_4)_2$ on sample | None | 0.26 | 0.78 |
| Original amount of copolymer on sample (wt. percent) | 2.72 | 3.24 | 3.74 |
| Amount of copolymer on sample after 4 hrs. extraction | 1.19 | 2.07 | 2.20 |
| Amount of copolymer on sample after 8 hrs. extraction | 0.97 | (¹) | 1.80 |

¹ Not extracted.

EXAMPLE II

Twenty grams of ethylene-methacrylyl chloride random copolymer prepared by chlorinating the product produced by the process of Canadian Patent No. 655,298, having a weight ratio of ethylene to methacrylyl chloride of 89/11 was dissolved in 200 cc. of xylene and cooled to 50° C. To this was added 0.1 gram of ethylene imine and 5 cc. of triethylamine and stirring was continued for 1 hour. On addition of 5 cc. of methanol, the solution became clear. The solution was then padded on scoured cotton poplin. After drying for 15 minutes at 140° C., the weight gain was found to be 3.9%.

The treated sample of cotton along with an untreated control was washed in a high-foaming commercially available synthetic detergent composition containing a wetting agent, rinsed in hot water and hung up to dry. The treated sample appeared to be somewhat less wrinkled than the control.

The two samples were then immersed in a solution of 2.25 grams of a commercially available dry-cleaning detergent containing sulfonated mahogany oil and 150 cc. tetrachloroethylene, followed by line drying, washing in a boiling aqueous solution of the high-foaming detergent composition and drip drying. The treated sample was noticeably softer in hand and more wrinkle resistant after these steps, than the control.

EXAMPLE III

One hundred grams of an ethylene-methacrylyl chloride copolymer containing about 6% methacrylyl chloride was dissolved in 1 liter of dry toluene at 70° C. Twenty-five cc. of triethylamine was added followed by 5.0 grams of propylene imine. The solution was heated for 30 minutes at 70° C. and then precipitated into acetone. The infrared scan indicated a complete conversion to the acyl aziridine copolymer, i.e., ethylene/N-methacrylyl-2-methyl aziridine.

Application to wool

Twelve-inch square pieces of wool flannel were treated in various ways prior to treatment with the above copolymer. Three cloths were padded in a 0.5% solution of $Zn(BF_4)_2$, weighed and dried. Three cloths were padded in a 1% solution of the above copolymer in tetrachloroethylene containing 1% triethylamine. A seventh sample was heated by immersing in distilled water. The first three samples, after drying, were padded in a 1% solution of the above described aziridine copolymer.

These samples, after removal of solvent, were washed in an accelerated 75 minute wash in an automatic washer. The shrinkage results are shown below:

| Sample | Cat. pickup | Resin pickup, percent | Shrinkage, area percent | |
|---|---|---|---|---|
|  |  |  | 4 washes | 8 washes |
| 1 | 0.5 $Zn(BF_4)_2$ | 2.4 | 0.0 | 0.0 |
| 2 | 0.6% $Zn(BF_4)_2$ | 2.2 | +1.25 | 2.5 |
| 3 | 0.6% $Zn(BF_4)_2$ | 2.2 | 2.5 |  |
| 4 | None | 2.4 | 2.5 |  |
| 5 | Triethylamine | 2.4 | 1.25 |  |
| 6 | do | 2.4 | 0.0 | 0.0 |
| 7 | do | 2.4 | 0.0 | 0.0 |
| 8 | Control |  | 47.3 | 55.0 |

Samples 3, 4 and 5 from the preceding table, after four washes, were extracted in boiling toluene for four hours. They were then washed an additional four times with the following results:

| Sample | Shringage, area percent | |
|---|---|---|
|  | After 4 hours in tolune | After 4 additional washes |
| 3 | −2.5 | −1.25 |
| 4 | −4.0 | −3.75 |
| 5 | −2.5 | −2.5 |
| Control |  | −55.0 |

EXAMPLE IV

A random styrene-methacrylyl chloride copolymer was prepared from a styrene-methacrylic acid copolymer containing about 10 weight percent methacrylic acid by dissolving 8 grams of copolymer in 200 cc. of tetrachloroethylene containing 4 grams of thionyl chloride and 0.2 cc. of a solution of 2 cc. of triethylamine dissolved in 100 cc. of perchloroethylene. The solution was heated at 65° C. for 8 hours and then about 10 cc. of distillate was distilled over until the head temperature reached 120° C. to remove excess thionyl chloride. An infrared scan obtained on this polymer indicated the formation of the acid chloride as shown by the appearance of a peak at $5.55\mu$ and the disappearance of the acid carbonyl peak at $5.9\mu$.

To the solution was then added 6 cc. of triethylamine and 2.0 cc. propylene imine. The solution was stirred for 10 minutes at 30–40° C. and the polymer was recovered from the solution by addition of the solution to a large volume of methanol. The soft mass was washed repeatedly with methanol and then pressed into a film. Infrared examination of the film indicated the styrene/N-methacrylyl-2-methyl aziridine copolymer was prepared as indicated by the sharp amide carbonyl at $5.99\mu$, the sharp peak at 7.15 indicative of the methyl group on the aziridine ring and the complete lack of NH absorption in the $3.0\mu$ region which indicates that ring opening has not occurred.

EXAMPLE V

A methyl methacrylate/methacrylic acid containing 18% methacrylic acid was converted to the corresponding acid chloride using thionyl chloride in toluene, and 2-ethoxyethanol in substantially the same manner as that described in the previous example.

Twenty grams of the solution containing 6.0 grams of acid chloride copolymer was diluted with 80 grams of dry toluene. To this solution was added 2.0 cc. of triethylamine and 2.0 cc. propylene imine. The sample was stirred for about 15 minutes and a portion of solution was evaporated on a salt plate. Infrared examination showed that the acid chloride was completely converted to the aziridine composition. Evidence for this conversion is shown by loss of acid chloride carbonyl absorption at $5.55\mu$ with attendant strong absorption peak at $5.99\mu$ and sharp peak at $7.1\mu$ indicative of ring methyl group. Lack of any significant peak (NH) at $2.9\mu$ and amide II peak at $6.5\mu$ indicates no significant opening of aziridine ring.

EXAMPLE VI

Five grams of ethylene/N-methacrylyl-2-methyl aziridine was dissolved in 200 cc. of dry toluene at 60° C. Six cc. of absolute alcohol was added and the solution heated to 95° C. for one hour. One-half of the solution was precipitated into acetone and infrared examination showed no evidence of any reaction. To the remaining one-half of the original solution was added one drop of methane sulfonic acid and the solution heated at 95° C. for one hour and the solution precipitated with acetone. After washing with acetone-water (50/50) and then acetone, infrared examination showed that the aziridine ring had opened as shown by absorption at $2.9\mu$ (NH), absorption at $6.6\mu$ (amide II band indicative of N-substituted amide), and ether (C—O—C) absorption at $9.0\mu$.

EXAMPLE VII

Five grams of an ethylene/N-methacrylyl-2-methyl aziridine copolymer was dissolved in 200 cc. dry toluene at 60–70° C. and $BF_3$ gas was slowly bubbled through solution. The resulting solution was heated for 15 minutes and the polymer precipitated into acetone containing 5% water. After washing and drying, the polymer was pressed into a film. An infrared scan of the film showed that the aziridine ring was opened to give the straight chain substituted amide.

EXAMPLE VIII

Triethylamine hydrochloride was prepared by reaction of dry HCl gas on a solution of triethylamine in dry toluene. The resulting triethylamine hydrochloride was washed and dried. A solution of 2 grams of ethylene/N-methacrylyl-2-methyl aziridine containing about 7% of N-methacrylyl-2-methyl aziridine in 100 cc. of dry toluene was prepared and 0.02 gram of the dry triethylamine hydrochloride was added. After heating the resulting solution for ½ hour at 70° C., the polymer was precipitated into acetone, washed and dried. Infrared examination of a film of the polymer indicated that the aziridine ring had opened to give the straight chain substituted amide copolymer.

Although the copolymers of this invention are primarily useful as coating compositions for various organic substrates, the copolymers may also be used as films, molding powders, fibers and the like. Various stabilizing additives may be added to these compounds to improve their resistance to heat, light, and oxidation.

I claim:

1. A copolymer containing polymerized alpha-olefin units having the formula

where $R_1$ is selected from the class consisting of hydrogen, halogen and hydrocarbon radicals having 1 to 8 carbon atoms, and $R_2$ is selected from the class consisting of hydrogen, halogen and methyl radicals, said alpha-olefin units being present in the copolymer to the extent of at least 50 mole percent, and at least 0.2 mole percent polymerized units containing the radical having the formula

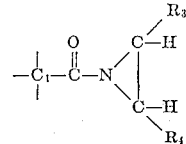

where $C_1$ is a carbon atom in the main copolymer chain, and $R_3$ and $R_4$ are selected from the class consisting of hydrogen and hydrocarbon groups having 1 to 6 carbon atoms.

2. A process which comprises reacting a copolymer containing at least 50 mole percent polymerized alpha-olefin units having the formula

where $R_1$ is selected from the class consisting of hydrogen, halogen and hydrocarbon having 1 to 8 carbon atoms and $R_2$ is selected from the class consisting of hydrogen, halogen and methyl radicals, and at least 0.2 mole percent polymerized alpha,beta-ethylenically unsaturated carboxylic acyl halide units having 3 to 8 carbon atoms, with a compound having the formula

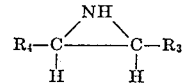

where $R_3$ and $R_4$ are selected from the class consisting of hydrogen and hydrocarbon groups having 1 to 6 carbon atoms, thereby forming polymeric units containing radicals having the formula

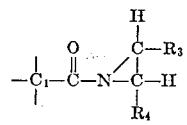

where $C_1$ is a carbon atom in the main copolymer chain.

3. The process of claim 2 in which the reaction takes place in a hydrocarbon solvent for the copolymer, and in which the amount of compound added is at least stoichiometrically equivalent to the number of acyl halide units.

4. A composite which comprises an organic substrate material containing Z— groups, where Z— is selected from the class consisting of hydroxyl groups, amine groups, amide groups, and carboxyl groups, and a coating on said substrate material of a copolymer containing at least 0.2 mole percent based on the total number of moles of units in the copolymer, units having radicals having the formula

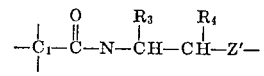

where $C_1$ is a carbon atom in the main copolymer chain, $R_3$ and $R_4$ are selected from the class consisting of hydrogen and hydrocarbon groups having 1 to 6 carbon atoms, and Z'— is a divalent radical derived from a Z— group and contains one less hydrogen atom than the Z— group.

5. A process for producing the composite of claim 4 which comprises reacting a copolymer containing alpha-olefin units and units containing radicals having the formula

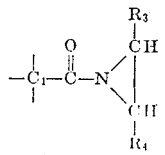

where $C_1$ is a carbon atom in the main copolymer chain and $R_3$ and $R_4$ are selected from the class consisting of hydrogen and hydrocarbon radicals having 1 to 6 carbon atoms, with an organic substrate containing groups selected from the class consisting of hydroxyl, amine, amide, and carboxyl groups.

6. The process of claim 5 in which the reaction takes place in the presence of a catalytic amount of material capable of coordinating with unshared electron pairs.

7. The process of claim 5 in which the reaction takes place in an aqueous mixture.

References Cited
UNITED STATES PATENTS

| | | | |
|---|---|---|---|
| 3,261,797 | 7/1966 | McDowell et al. | 260—29.6 |
| 3,301,700 | 1/1967 | Maloney | 260—80.73 XR |

JOSEPH L. SCHOFER, *Primary Examiner.*

J. KIGHT III, *Assistant Examiner.*